UNITED STATES PATENT OFFICE.

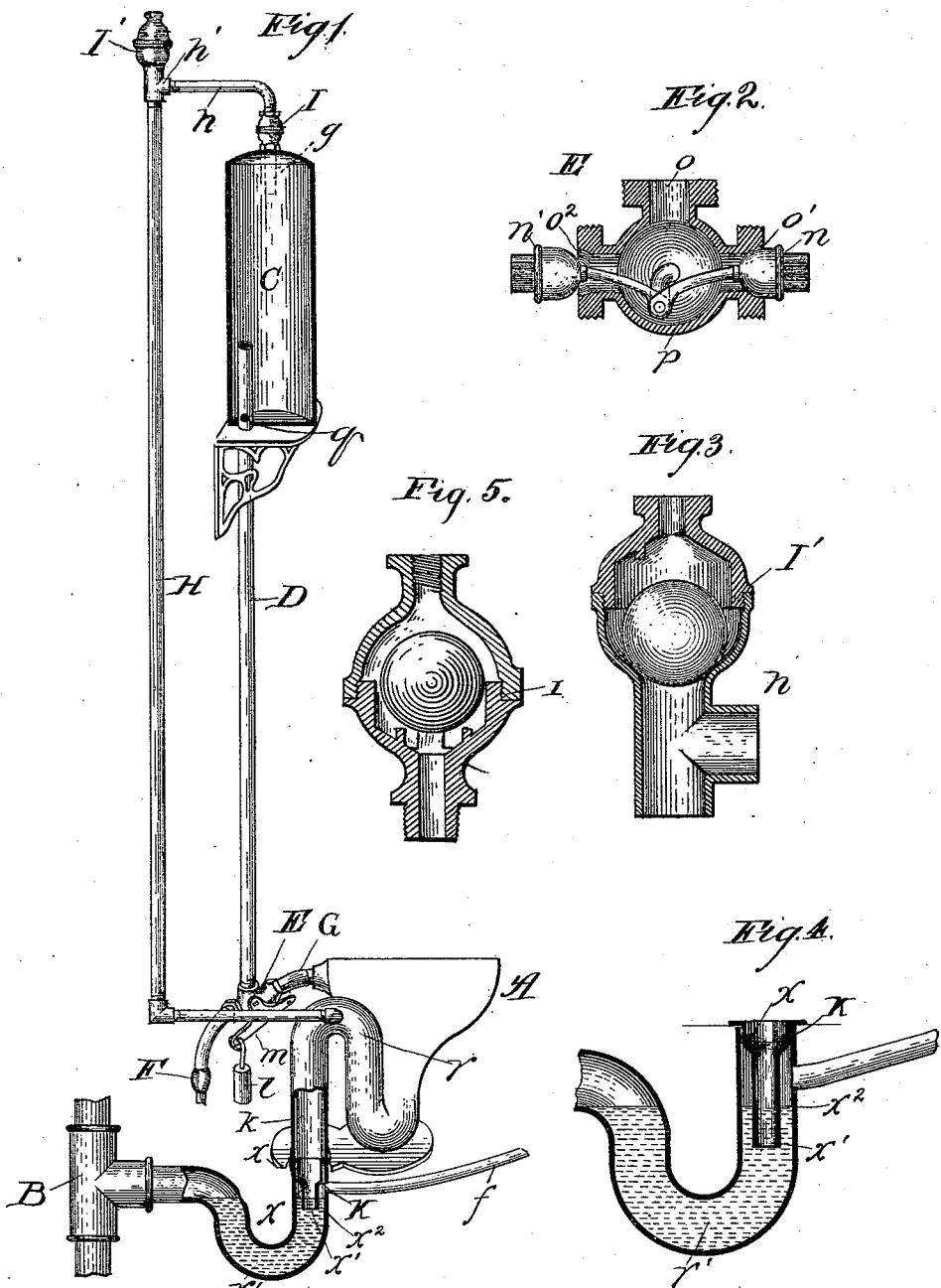

JOHN KELLY, OF CHICAGO, ILLINOIS.

WATER-CLOSET.

SPECIFICATION forming part of Letters Patent No. 428,278, dated May 20, 1890.

Application filed November 19, 1889. Serial No. 330,847. (No model.)

*To all whom it may concern:*

Be it known that I, JOHN KELLY, a citizen of the United States, residing at Chicago, in the county of Cook and State of Illinois, have invented a new and useful Improvement in Water-Closets, of which the following is a specification.

My invention relates to an improvement in the class of water-closets in which the waste-pipe is provided with a double trap, and in which a reservoir or tank is used to contain the water for flushing, the supply to the bowl for the purpose being controlled by the user of the closet.

The objects of my improvement are to insure the outflow of the contents of the traps whenever the flushing operation is performed, and to afford a generally improved construction of the flushing apparatus of water-closets.

In the accompanying drawings, Figure 1 is a view in perspective, partly broken and sectional, showing my improvement in all its details. Fig. 2 is a broken sectional view showing the form of valve which I prefer to employ for controlling the passages to and from the flushing-tank; Fig. 3, a detail in sectional elevation; Fig. 4, a broken and partly sectional view of details of construction, and Fig. 5 a view in sectional elevation of an air-vent and float-valve.

A is the bowl, from which extends the trap $r$, which is connected with a second trap $r'$, leading directly into the soil-pipe B.

C is the tank, supported in an elevated position, and having extending into it, preferably through its base and some distance, as shown, a pipe D, provided near the base of the tank with an aperture $q$. The lower end of the pipe D leads into the chamber of a suitable valve device E, which performs, generally stated, the functions of a three-way valve, and may be such, though I prefer the construction illustrated, which represents the valve for which Letters Patent of the United States No. 256,222 were granted me on the 11th day of April, 1882.

My valve referred to comprises a shell $p$, having the three openings $o$, $o'$, and $o^2$, and containing the valves $n$ and $n'$, connected together at their stems within the shell to operate simultaneously on turning the lever controlling them, the one to open the passage controlled by it, while the other closes that controlled by it. In the present connection the valve $n'$ extends into a supply-pipe F, and the valve $n$ into a branch G, leading from the valve-shell $p$ to the bowl A, as shown, and the lever $m$ for operating the valves is shown to be weighted at one end, the other end being designed to be connected in any common or usual manner with the seat (not shown) of the closet, which, when depressed by occupancy, turns the lever to actuate the valves to open the passage from the supply F to the tank C through the pipe D and close communication with the branch G, and which, when vacated, is automatically raised by the action of the weight $l$, which turns the lever $m$ in the opposite direction to actuate the valves $n'$ and $n$, respectively, to shut off the supply and open communication between the pipe D and branch G, or, in other words, between the tank C and bowl A. Obviously, however, the arrangement may be such as to provide normally a supply of water in the tank, to be admitted to the bowl for flushing by the occupant of the closet manipulating a lever, chain, or the like, as is quite common.

If with the arrangement as shown and the parts as thus far described the supply from the tank were admitted to the bowl it would overflow the latter, owing to the space $k$ between the traps $r$ and $r'$ being "air-bound," thus preventing the contents of the traps from discharging into the soil-pipe B. To obviate this I provide an air-pipe H, leading from such space $k$ into the tank C, preferably at the top of the latter, through an air-vent float-valve I, communicating through a branch pipe $h$ at $h'$ with the pipe H below a valve I' in its upper end, and which may be substantially like the valve I, or a mere check-valve, and the shell of which is normally open to the surrounding atmosphere. The air-vent float-valve I involves a ball in the shell, permitting the passage of air in either direction through the device, but affording an effective obstruction to the discharge through it of water, as in the device set forth in Letters Patent No. 313,081, dated March 3, 1883.

The operation is then as follows: When the seat is occupied, and therefore depressed, the supply of water from the pipe F is admitted to and fills the tank C through the pipe D. When the seat is vacated, (or the valve device E otherwise actuated for the purpose,) the contents of the tank flow through the pipe D into the bowl, and in so doing draw the air contained between the traps $r$ and $r'$ through the pipe H, whence it escapes through the valve I', thereby relieving the air-bound condition of the trap $r$, and causing the partial vacuum in the space $k$ thus produced to effect the discharge of the contents of the trap and permit the flushing-supply to course to the waste-pipe B. The purpose of causing the pipe D to extend some distance into the tank is to prevent the escape of the entire contents of the latter for the flushing through the top of the pipe and permit the remnant of the supply beyond which the pipe extends to run through the opening $q$ into the bowl and trap $r$ to produce the desirable water seal after the flushing operation is concluded.

The pipe-extension $g$ (indicated by dotted lines in Fig. 1) of the air-vent and float-valve I, and which extends some distance into the tank below its upper end, affords a desirable adjunct for use with my improvement, inasmuch as it serves to prevent pounding by the water, or "water-hammer," as it is termed, since when the supply under high pressure— say sixty pounds—through the pipe D enters the tank (in which it compresses the air contents thereof and would drive them all out through the valve I were the tank-opening leading into the latter only in the plane of the shell of the tank) it compresses sufficient of the air contents around the pipe $g$ against the top of the tank, thereby to afford an air-cushion, which prevents the water-hammer referred to.

Another important adjunct for use not only with my specific improvement thus described, but equally with any other construction of closet in which provision shall be made for relieving traps $r$ and $r'$ from the air-bound condition of the space between them, and where, as commonly, a waste-pipe $f$ from some extraneous source, as a bath-tub or urinal, leads into the trap $r'$ above the water-line therein, is afforded by the sleeve K. This is enlarged toward its upper end, as shown at $x$, where it fits the upper end of the vertical portion of the trap $r'$, into which it is adjusted, before the two traps are cemented together at the extremities of their vertical positions, and its narrower extension $x'$ reaches into the trap $r'$ below the water-line therein, leaving an annular space $x^2$ around it above the water-line.

If where a waste-pipe is provided the sleeve were omitted, the discharge for flushing of the contents of the tank A would not, by drawing air through its pipe D, effectually exhaust the air from between the traps for the purpose stated, since the waste-pipe would afford an open passage to an air-supply, (which might, furthermore, be more or less obnoxious,) and thus prevent the desired exhaustion. The sleeve by affording, practically, a perforated diaphragm at its upper end and extending below the water-line at its lower end, narrowed to avoid obstructing the inlet from the waste-pipe $f$, closes all communication between the latter and the air-space $k$, and thus avoids all hinderance to the exhaustion of the air therefrom. Obviously, any discharge from the tank C, whether through the pipe D alone or otherwise, would induce the desired effect of overcoming the air-bound condition of the space $k$, and would therefore be included as within the spirit of my invention.

What I claim as new, and desire to secure by Letters Patent, is—

1. In combination with a bowl A and its flushing-tank C, traps $r$ and $r'$, an air-vent and float-valve I in the upper end of the tank, an air-pipe H, leading from between the traps and provided with a check-valve I' in its upper end, a branch $h$, connecting the air-vent and float-valve I with the pipe H below the valve I', and a water-discharge pipe leading from the tank, substantially as described.

2. In combination, a bowl A, traps $r$ and $r'$, a tank C, having an air-vent and float-valve I in its upper end, an air-pipe H, leading from between the traps to the said air-vent and float-valve, a pipe D, communicating from one end with the bowl and with the water-supply and extending at its opposite end into and beyond the base of the tank, and provided with an aperture $q$ near said base, and a three-way-valve device E at the junction of the pipe D with the bowl and water-supply, the whole being constructed and arranged to operate substantially as described.

3. In combination with a bowl A and its tank C, traps $r$ and $r'$, the lower trap having a lateral inlet, a sleeve K in the trap $r'$, extending beyond the said inlet and below the water-line in the trap, an air-pipe H, leading from between the traps into the tank, and a water-discharge pipe leading from the tank, substantially as and for the purpose set forth.

JOHN KELLY.

In presence of—
J. W. DYRENFORTH,
C. H. WHITE.